(12) United States Patent  (10) Patent No.: US 7,236,329 B2
Kubotera  (45) Date of Patent: Jun. 26, 2007

(54) HEAD SLIDER HAVING EXTENSION RAILS TO PROVIDE UNIFORM FLOTATION AND MAGNETIC DISK DEVICE INCLUDING THE SAME

(75) Inventor: Hiroyuki Kubotera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 10/785,971

(22) Filed: Feb. 26, 2004

(65) Prior Publication Data

US 2005/0013049 A1    Jan. 20, 2005

(30) Foreign Application Priority Data

Jul. 15, 2003   (JP) .............................. 2003-274978

(51) Int. Cl.
*G11B 5/60* (2006.01)
(52) U.S. Cl. .................................. 360/236.3
(58) Field of Classification Search ............. 360/236.3
See application file for complete search history.

(56) References Cited

U.S. PATENT DOCUMENTS

| | | | | |
|---|---|---|---|---|
| 4,225,891 A * | 9/1980 | Plotto ...................... | 360/236.4 |
| 5,438,467 A | 8/1995 | Dorius et al. | |
| 6,057,983 A * | 5/2000 | Kajitani .................... | 360/235.6 |
| 6,449,126 B1 * | 9/2002 | Dorius et al. ............. | 360/236.3 |
| 6,590,746 B2 * | 7/2003 | Kang et al. ............... | 360/236.3 |
| 6,710,976 B2 * | 3/2004 | Chapin et al. ............ | 360/235.8 |
| 6,744,599 B1 * | 6/2004 | Peng et al. ............... | 360/236.2 |
| 6,809,904 B2 * | 10/2004 | Boutaghou et al. ...... | 360/235.8 |
| 6,920,015 B2 * | 7/2005 | Mundt et al. ............. | 360/235.6 |
| 2003/0011934 A1 * | 1/2003 | Kameyama .............. | 360/236.1 |

FOREIGN PATENT DOCUMENTS

| | | |
|---|---|---|
| JP | 6-195916 | 7/1994 |
| JP | 8-263823 | 10/1996 |
| JP | 11-149733 | 6/1999 |
| JP | 2000-57724 | 2/2000 |
| JP | 2000-173217 | 6/2000 |

* cited by examiner

*Primary Examiner*—A. J. Heinz
(74) *Attorney, Agent, or Firm*—Armstrong, Kratz, Quintos, Hanson & Brooks, LLP

(57) ABSTRACT

A head slider including a disk-facing surface having an inflow end and outflow end, inflow-end-side rail, negative pressure part, three extension rails, a pair of siderails, an inflow-end-side-positive-pressure part, and outflow-end-side-positive-pressure part, and an outflow end rail. The extension rails protrude towards the negative pressure part, and are formed lower than the inflow-end-side-positive-pressure part. As a result of air flowing in from the inflow end, a positive pressure (flotation force) is imparted to the inflow-end-side-positive-pressure part, and a negative pressure is imparted to the negative pressure part. The negative pressure which cancels the positive pressure acts to a suitable extent without being affected by atmospheric pressure variations, so the flotation amount is controlled to a fixed value regardless of variations of altitude (atmospheric pressure).

26 Claims, 8 Drawing Sheets

PRIOR ART

HEAD SLIDER HAVING EXTENSION RAILS TO PROVIDE UNIFORM FLOTATION AND MAGNETIC DISK DEVICE INCLUDING THE SAME

CROSS-REFERENCE TO RELATED APPLICATIONS

This application is based upon and claims the benefits of the priority from the prior Japanese Patent Application No. 2003-274978, filed in Jul. 15, 2003, the entire contents of which are incorporated herein by reference.

BACKGROUND OF THE INVENTION

1. Field of the Invention

The present invention relates to a head slider suitable for a magnetic disk device (hard disk drive) of a computer or the like, and to a magnetic disk device including the same.

2. Description of the Related Art

A magnetic disk device comprises a head slider. For example, as shown in FIG. 1, when information is written on or read out from a magnetic disk 5 of a magnetic disk device 100, the head slider 1 is positioned against the magnetic disk 5. Then, as for example shown in FIG. 2, it floats over the magnetic disk 5 due to an air current produced on the surface of the rotating magnetic disk 5. At this time, if the flotation amount of the head slider 1, i.e., the gap between the head slider 1 and magnetic disk 5, is too large, recording can no longer be performed. Therefore, in the head slider 1 of the prior art, as shown for example in FIG. 3, a negative pressure part 10 which generates a negative pressure aspirating it towards the magnetic disk 5 on the surface (ABS: Air Bearing Surface) facing the magnetic disk 5, is provided which balances the flotation by the negative pressure so that the flotation of the head slider 1 is controlled to a fixed amount.

However, the flotation amount of the head slider, i.e. the gap between the head slider and rotating magnetic disk, is on the order of just several nanometers. For example, considering that the diameter of a virus is of the order of 200 nm, it can be appreciated how small this number is. In order to realize stable recording with the magnetic disk device, an interval of several tens of nanometers from the rotating magnetic disk must be maintained when the head slider is in use. Consequently, the design of the head slider is extremely difficult.

The design of the head slider requires the following:

(1) the head slider must be able to maintain a uniform flotation amount from the inner area to the outer area of the magnetic disk (as the speed of the outer area of the magnetic disk is approximately twice as much as that of the inner area and the speed vector direction varies by approximately 25°, it must be able to maintain a uniform flotation amount taking this point into consideration), (2) the head slider must be able to maintain a fixed flotation amount during a seek operation (as the flow velocity direction varies by approximately 15°, it must be able to maintain a fixed flotation gap taking this point into consideration), (3) it must be possible to use the head slider even when the atmospheric pressure varies (ensuring that it can be used at an altitude of 3000 m), and (4) it must be possible to use the head slider even when there are manufacturing errors or assembly errors (considering that the gap between the head slider and magnetic disk is only of the order of several tens of nanometers, manufacturing or assembly errors are serious defects which are not normally allowed, but it must be possible to use the head slider even in these circumstances).

In recent years, with increasing recording densities of magnetic disks, a demand has emerged to reduce the flotation amount of the head slider even further. However, if the flotation amount is further reduced, when the slider is used at high altitude, the flotation amount decreases still further due to the drop in atmospheric pressure, and the head slider and magnetic disk may come in contact which damages the magnetic disk so that recording can no longer be performed, which is a serious problem. Therefore, of the aforesaid requirements (1)–(4) in designing the head slider, (3), i.e., the ability to use the head slider even when there is an atmospheric pressure change (ensuring that it can be used at an altitude of 3000 m) is a key point.

In the prior art, to resolve this problem, it has been proposed for example in Japanese Patent Application Laid-Open (JP-A) No. 2000-57724 to adopt a design wherein, in the aforesaid head slider, the ratio (deep groove depth R/shallow groove depth δs) between the "deep groove depth R" and "shallow groove depth δs" is larger than 5. However, in this case, as the range in which the variation of flotation amount is small relative to groove depth variation is actually very narrow, the groove depth is limited and it is difficult to set the groove depth to the optimum value relative to the scatter in the manufacturing procedure. It has also been proposed to provide a standard atmospheric pressure pocket inside the head slider and perform pressure control of this standard pressure pocket, so that the reduction of flotation amount due to pressure drop is suppressed. However, in this case, as it is necessary to provide the standard atmospheric pressure pocket, the construction becomes more complicated and manufacturing costs increase.

Therefore, a head slider which maintains a uniform flotation amount from the inner area to the outer area of a magnetic disk, maintains a fixed flotation gap even during seek operations, has no limitation of groove depth wherein the fluctuation of flotation amount relative to groove depth can be optimized, does not require additional structures or manufacturing costs, is not subject to limitations due to manufacturing errors and assembly errors and which can be used even if the atmospheric pressure varies (can be used even at an altitude of 3000 m), and a high-performance magnetic disk device comprising the same, had still not been proposed.

It is therefore an object of the present invention, which was conceived to resolve the aforesaid problems inherent in the prior art, to provide a head slider which maintains a uniform flotation amount from the inner area to the outer area of a magnetic disk, maintains a fixed flotation gap even during seek operations, has no limitation of groove depth wherein the fluctuation of flotation amount relative to groove depth can be optimized, does not require additional structures or manufacturing costs, is not subject to limitations due to manufacturing errors and assembly errors and which can be used even if the atmospheric pressure varies (can be used even at an altitude of 3000 m), and a high-performance magnetic disk device comprising the same.

SUMMARY OF THE INVENTION

The head slider of the present invention comprises a disk-facing surface having an inflow end through which air flows in, an outflow end from which air flows out, an inflow-end-side rail extending along the inflow end, a negative pressure part situated closer to the outflow end than the inflow-end-side rail, the negative pressure part developing a negative pressure while in use, and two or more extension rails extending from the inflow end side to the outflow end side in the negative pressure part. In the head slider of the present invention, two or more extension rails extend from the inflow end side to the outflow end side in the negative pressure part, so it can be used even if the atmospheric pressure varies (e.g. at an altitude of 3000 m), the negative pressure of the negative pressure part is suitably controlled, and there is little risk that it will come into contact with the rotating magnetic disk. Therefore, the distance between the magnetic disk and a portion of the head slider in the vicinity of the head element is controlled to the shortest distance.

The magnetic disk device of the present invention comprises at least the head slider of the present invention. As a result, the magnetic disk device can be used even if the atmospheric pressure varies (even at an altitude of 3000 m), the negative pressure of the negative pressure part is suitably controlled, and there is little risk that the head slider will come in contact with the rotating magnetic disk.

Figure 1:
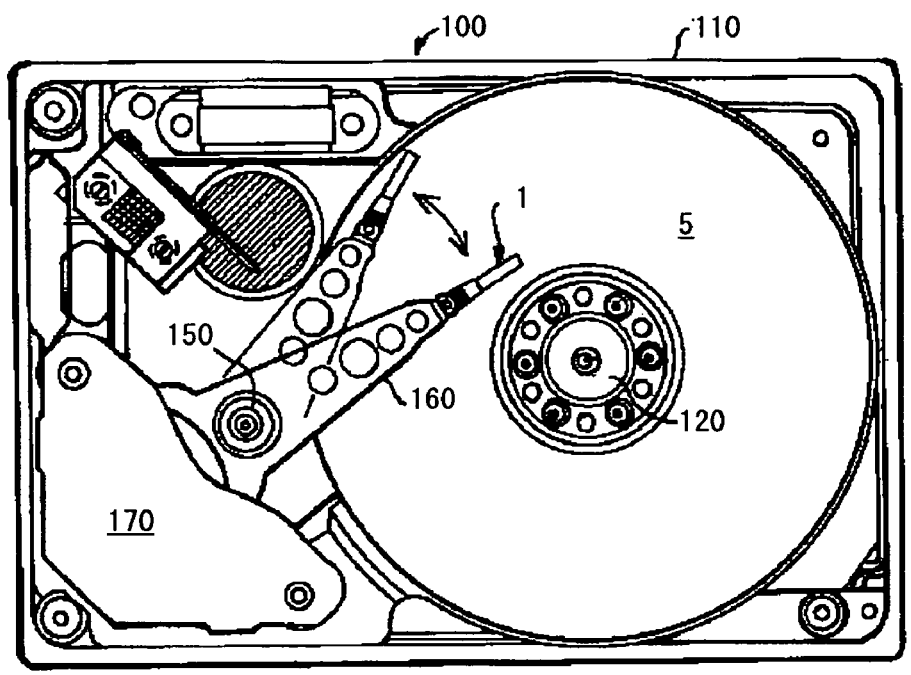
FIG. 1 is a schematic view showing one example of a magnetic disk device provided with a head slider.

DESCRIPTION OF THE PREFERRED EMBODIMENTS (Head Slider)

The head slider of the present invention comprises at least an inflow end, outflow end, inflow-end-side rail, negative pressure part, and two or more extension rails. It may further comprise a siderail, inflow-end-side-positive-pressure part, outflow-end-side-positive-pressure part and outflow end rail, all of which are suitably selected as required. These are installed on the surface facing the magnetic disk, i.e., the air outflow/inflow surface (ABS (Air Bearing Surface)). In this specification, including the claims, this surface may be referred to as "a disk-facing surface," "floating surface," "surface opposite the magnetic disk," or the like, which will be clear from to the context.

The inflow end functions as an inlet for the air currents produced over the rotating magnetic disk, i.e., as an end part into which air flows. The shape, construction, and size of the inflow end are not particularly limited and may be suitably selected according to the purpose from among those known in the art.

The outflow end functions as an outlet for the air currents produced over the rotating magnetic disk, i.e., as an end part from which air flows out. The shape, construction, and size of the outflow end are not particularly limited and may be suitably selected according to the purpose from among those known in the art.

The inflow-end-side rail (hereafter, may be referred to as "front rail") extends along the inflow end. The inflow-end-side rail is disposed on the inflow end side, but may be disposed in contact with the inflow end. The inflow-end-side rail may be disposed so that it is not continuous along the inflow end, but is preferably disposed so that it is continuous along the inflow end. The shape of the inflow-end-side rail is not particularly limited and may be suitably selected according to the purpose, for example it may conveniently be belt-shaped. The width of the inflow-end-side rail is not particularly limited and may be suitably selected according to the purpose, but it is preferably approximately constant.

The negative pressure part is situated nearer to the outflow end side than the inflow-end-side rail, and it is a position which develops a negative pressure while in use. The method of forming the negative pressure part is not particularly limited and may be suitably selected from among the methods known in the art according to the purpose. For example, in a preferred aspect, it is bordered by siderails nearer to the outflow end than the inflow-end-side rail and at both sides relative to the direction of from the inflow end to the outflow end, extending along that direction. In a more preferred aspect, it is defined by the siderails and an outflow-end-side-positive-pressure part disposed on the outflow end side of the inflow-end-side rail.

At this time, when the head slider is installed with the surface opposite the magnetic disk, i.e., with the air outflow/inflow surface (ABS (Air Bearing Surface) facing down, the siderails preferably protrude further downwards than the negative pressure part, and the inflow-end-side-positive-pressure part preferably protrudes further downwards than the inflow-end-side rail and siderails. In this case, due to the air flowing in from the inflow end, the inflow-end-side-positive-pressure part protruding nearest to the magnetic disk in the head slider floats up, a positive pressure (flotation force) is imparted to the inflow-end-side-positive-pressure part tending to separate it from the magnetic disk, and after the air has passed through the inflow-end-side-positive-pressure part, a negative pressure aspirating towards the magnetic disk is imparted to the negative pressure part furthest from the magnetic disk in the head slider.

The shape, size (width, length) of the siderail is not particularly limited, and can be suitably selected according to the purpose. For example, the shape is preferably a belt shape, the width being preferably approximately the same, and more preferably about the same as that of the extension rails described later. The length is preferably shorter than that of the extension rails described later, the end part of its outflow end side being situated more towards the inflow end than the end part on the outflow end side of the extension rails, or alternatively it is of identical length (situated at an identical position).

Also, the inflow-end-side-positive-pressure part is situated nearer to the outflow end side than the inflow-end-side rail and nearer to the inflow end than the extension rails and siderails, and it is a site which develops a positive pressure while in use. However, if the head slider comprises this inflow-end-side-positive-pressure part, it is preferred that the inflow-end-side-positive-pressure part extends in the width direction along the inflow-end-side rail and in contact with this inflow-end-side rail, and that at least one (or all) of the end parts on the inflow end side of the extension rails and siderails is in contact with the inflow-end-side-positive-pressure part. In this specification, including the claims, the "width direction" of the head slider is substantially perpendicular to the direction from the inflow end to the outflow end. Accordingly, "both ends in the width direction" substantially means both sides.

The head slider of the present invention must comprise two or more extension rails in the negative pressure part, and preferably comprises three or more extension rails. In the head slider of the present invention, two or more extension rails appear as the teeth of a comb, so that these two or more extension rails may be referred to as "toothcomb rails."

The shape of the extension rails, the shape of the end part of the extension rails, size (width, length) of this extension rail, gaps between the extension rails, and the surface area percentage of the extension rails in the negative pressure part area, are not particularly limited and may be suitably selected according to the purpose.

The shape of the extension rail is for example preferably a belt shape or the like. The end part shape on the outflow side of the extension rail is preferably a shape having a plane parallel to the width direction of the head slider. The width of the extension rails (indicated by the double-headed arrow accompanied by "L" in FIGS. 4–8) for example may be approximately constant or may not be constant, but the former is normally preferred, and it is more preferred that the width be about the same as that of the siderail described earlier. Specifically, the size is preferably 5 µm to 100 µm, more preferably 10 µm to 50 µm and still more preferably 20 µm to 40 µm. The distance between extension rails (indicated by the double-headed arrow accompanied by "S" in FIGS. 4–8) for example may or may not be approximately constant and equal. Specifically, it is preferably 10 µm to 120 µm, more preferably 40 µm to 90 µm and still more preferably 50 µm to 80 µm. The surface area occupied by the extension rails in the negative pressure part is preferably 10% to 80%, but more preferably 20% to 70%. The aforesaid shapes and widths may be identical or different, but from the viewpoint of ease of manufacture, the former is normally preferred.

It is preferred that the lengths of all the extension rails are comparative to those of the siderails, i.e., the end parts on the outflow end side of all the extension rails preferably protrude by approximately the same amount as the end parts of the siderails on the outflow end side. And it is more preferred that the end part on the outflow end side of at least one extension rail extends so that it protrudes more towards the outflow end side than the end parts on the outflow end side of the siderails (hereafter, this may be referred to as "protruding aspect").

In the case of the aforesaid protruding aspect, in a preferred aspect, one or more extension rails situated close to the center among the extension rails (hereafter, may be referred to as "central extension rail") are provided wherein the end part(s) on the outflow end side of the central extension rail(s) protrudes more towards the outflow end side than the end parts on the outflow end side of the other extension rails. Specifically, it is more preferred that in a first aspect, there is an odd number of extension rails wherein the end part on the outflow end side of the central extension rail, which is situated an equal number of rails away starting from the siderails at both ends in the width direction and close to the center in the width direction, protrudes more towards the outflow end side than the end parts on the outflow end side of the other extension rails. And in a second aspect, there is an even number of extension rails wherein the end parts on the outflow end side of two central extension rails, which are situated an equal number of rails away starting from the siderails at both ends in the width direction and close to the center in the width direction, protrude more towards the outflow end side than the end parts on the outflow end side of the other extension rails.

In the case of the aforesaid protruding aspect, the end parts on the outflow end side of the extension rails preferably protrude further towards the outflow end side in succession from those situated adjacent to the siderails to those situated in the vicinity of the center. Also, in the case of this protruding aspect, a line joining adjacent center points in the width direction of the end parts on the outflow end side of the siderails and extension rails, is preferably a straight line from the siderails to the central extension rail(s).

In the head slider of the present invention, at least two of the end parts of the extension rails and the siderails on the inflow end side may be interconnected by a connecting rail extending in the width direction. If, for example, two extension rails are connected by this interconnecting rail where one extension rail is connected to each of the two end parts of the interconnecting rail, the joined rail formed by these two extension rails and interconnecting rail look like a "U", so the joined rail may be referred to as an "U-shaped rail".

The number of connecting rails is not particularly limited and may be suitably selected according to the purpose, for example, two or more. In this case, plural U-shaped rails can be formed. If plural U-shaped rails are formed, these U-shaped rails may be arranged in rows or small U-shaped rails can be contained within large U-shaped rails, and these arrangements may be combined or they may be used in conjunction with the aforesaid toothcomb rail. In this case, the toothcomb rail can be placed inside the U-shaped rail, the U-shaped rail can be placed between the aforesaid toothcomb rails, the U-shaped rail can be placed alongside the toothcomb rail, or these arrangements may be combined. The width of the connecting rail is not particularly limited and may be suitably selected according to the purpose, but for example it is preferably comparable to that of the extension rails.

The outflow-end-side-positive-pressure part is situated further towards the outflow end side than the extension rails and siderails, and it is a site which develops a positive pressure while in use. If the head slider comprises this outflow-end-side-positive-pressure part, a balance can be obtained between the flotation force (positive pressure) of the head slider and the negative pressure aspirating towards the magnetic disk, so reduction of the gap (flotation amount) between the head slider and the magnetic disk due to atmospheric pressure variations can be effectively suppressed, which is advantageous.

The shape, number and size (width, length) of the aforesaid outflow-end-side-positive-pressure part are not particularly limited and may be suitably selected according to the purpose. The shape for example need not be continuously formed along the outflow end, and is preferably a block shape. The number may for example be one or more, but is more preferably about from 2 to 4. The width for example is preferably larger than those of the extension rails. The length for example is preferably shorter than those of the extension rails. It is preferred that plural block-shaped outflow-end-side-positive-pressure parts are disposed along the outflow end, and in this case, the end parts on the outflow end side of the outflow-end-side-positive-pressure parts situated in the vicinity of the center in the width direction of the head slider, are more preferably situated further towards the outflow end side than the end parts on the outflow end side of other outflow-end-side-positive-pressure parts.

In the head slider of the present invention, when the head slider is positioned with the surface opposite the magnetic disk, i.e., the air outflow/inflow surface (ABS (Air Bearing Surface)) facing downwards, the inflow-end-side rail, siderails and extension rails preferably protrude further downwards than the negative pressure part, and the inflow-end-side-positive-pressure part and outflow-end-side-positive-pressure part preferably protrude downwards more than the inflow-end-side rail, siderails, and extension rails. In this aspect, a description was given of how much further other elements protrude downwards compared to the negative pressure part as a reference surface, but now, conversely, the question will be considered of how much deeper the grooves formed by other elements are compared to the inflow-end-side-positive-pressure part and outflow-end-side-positive-pressure part as reference surfaces. In this case, in this aspect, the inflow-end-side rail, extension rails, siderails or outflow end rails are formed lower (shallow grooves) than the inflow-end-side-positive-pressure part and outflow-end-side-positive-pressure part, and the negative pressure part is formed even lower (deep grooves) than the inflow-end-side rail, extension rails, siderails or outflow end rails. In this aspect, due to air flowing in from the inflow end, the inflow-end-side-positive-pressure part protruding furthest towards the magnetic disk in the head slider floats up, a positive pressure (flotation force) is imparted to the inflow-end-side-positive-pressure part tending to separate it from the magnetic disk, and after it has passed through the inflow-end-side-positive-pressure part, a negative pressure aspirating towards the magnetic disk is imparted to the negative pressure part furthest from the magnetic disk in the head slider. Due to the air passing through the negative pressure part, the inflow-end-side-positive-pressure part and the outflow-end-side-positive-pressure part protruding furthest towards the magnetic disk in the head slider, float up. Moreover, at this time, in the negative pressure part, two or more extension rails are provided, so the negative pressure can always be suitably controlled regardless of the variation of atmospheric pressure (altitude).

If this outflow-end-side-positive-pressure part is provided, when the head slider is disposed so that the surface opposite the magnetic disk, i.e., the air inflow/outflow surface (ABS (Air Bearing Surface)) is facing downwards, outflow end rails (hereafter, may be referred to as "rear rails") are preferably disposed adjacent to the inflow end side of the outflow-end-side-positive-pressure part, and in a manner that they do not protrude further down than the outflow-end-side-positive-pressure part, but further than the negative pressure part.

If this outflow end rail is provided, the contact edge of the outflow rail facing the negative pressure part and the line interconnecting mutually adjacent center points in the width direction of the end parts of the siderails and extension rails on the outflow end side may be substantially parallel.

In the head slider of the present invention, the difference of the degree of protrusion between the negative pressure part and each of inflow-end-side rail, extension rails, siderails and outflow end rail, i.e., how far these rails protrude relative to the negative pressure part, is not particularly limited and may be suitably selected according to the purpose, for example preferably about from 1 µm to 2 µm. Also, the difference of degree of protrusion between each of the inflow-end-side rail, extension rails, siderails and outflow end rail, and each of the inflow positive pressure part and outflow-end-side-positive-pressure part, is not particularly limited and may be selected according to the purpose, for example preferably about from 0.1 µm to 0.2 µm.

The head slider of the present invention preferably has a symmetrical shape having a plane of symmetry centered on a center axis extending from the inflow end side to the outflow end side.

The head slider of the present invention maintains a uniform flotation amount from the inner area to the outer area of the magnetic disk, maintains a constant flotation gap even during seek operations, has no limitation of groove depth, and allows optimization of the flotation amount variation relative to groove depth. Also, it does not require additional structures or manufacturing costs, is not subject to the limitations of manufacturing errors and assembly errors, and can be used even when the atmospheric pressure varies (even at an altitude of 3000 m). For this purpose, except that the surface facing the magnetic disk, i.e., the air outflow/inflow surface (ABS (Air Bearing Surface)) has the particular shape described above, the design is similar to that of a prior art head slider.

The material of the head slider is not particularly limited and may be selected from among those known in the art according to the purpose, but convenient examples include ceramics such as alumina-titanium carbide (Al/Ti/C).

The method of manufacturing the head slider is not particularly limited and may be selected from among those known in the art according to the purpose, but convenient examples include reactive etching, ion molding and ion milling.

Now, a typical example of the manufacture of the head slider of the present invention will be described. For example, firstly, an $Al_2O_3$ (alumina) layer is formed on an $Al_2O_3TiC$ (AlTiC) wafer, a magnetic head element is formed according to a method known in the art, and this magnetic head element is covered by an $Al_2O_3$ (alumina) layer. Next, this wafer is cut, and DLC (diamond-like carbon) layer is formed on the cut surface via a Si adhesion layer. A DLC layer is laminated on this DLC layer via a Si adhesion layer. Next, a patterning photoresist is coated on the DLC layer to form a resist layer, which is then exposed and developed to form a pattern, and ion milling is performed to abrade the DLC layers, Si adhesion layers and wafer. Due to this abrasion, the resist layer is removed. Next, the inflow-end-side rail, siderails and outflow end rail are patterned using the patterning photoresist, and the resist layer is removed to form the surface of the head slider opposite the magnetic disk, i.e., the air outflow/inflow surface (ABS (Air Bearing Surface).

The head slider of the present invention maintains a uniform flotation amount from the inner area to the outer area of the magnetic disk, maintains a constant flotation gap even during seek operations, has no limitation of groove depth, and allows optimization of flotation amount variation relative to groove depth. Also, it does not require additional structures or manufacturing costs, is not subject to the limitations of manufacturing errors and assembly errors, and can be used even when the atmospheric pressure varies (even at an altitude of 3000 m). It is therefore convenient to use with various magnetic disk devices, and is particularly suited for use with the magnetic disk device of the present invention.

(Magnetic Disk Device)

The magnetic disk device of the present invention comprises the head slider of the present invention, and further comprises other means or members suitably selected according to the purpose.

Examples of such other means or members are magnetic disks, magnetic disk rotation means which rotate the magnetic disk, a carriage arm holding the head slider at its end which can position the head slider floating above and facing the surface of the rotating magnetic disk, a shaft which supports the carriage arm free to rotate, an actuator which rotates the carriage arm, and a housing which houses these units.

The magnetic head which performs recording on the magnetic disk is not particularly limited and can be suitably selected according to the purpose, examples being a horizontal magnetic recording head and a vertical magnetic recording head. Of these, a vertical magnetic recording head is preferred. This vertical magnetic recording head is not particularly limited and may be suitably selected according to the purpose, an example being a single-pole head. This vertical magnetic recording head may be write-only, or it may be used for both write and read in a one-piece construction with a read head such as a GMR head or the like.

Here, an example of the magnetic disk device of the present invention will be described referring to FIG. 1. A magnetic disk device 100 shown in FIG. 1 comprises a housing 110, and a magnetic disk 5, spindle motor 120, head slider 1, shaft 150, carriage arm 160 and actuator 170 inside the housing 100.

The magnetic disk 5 can be rotated by the spindle motor 120, and is rotated by the spindle motor 120 during recording, etc. The head slider 1 is the head slider of the present invention, which is rotatably supported by the shaft 150 and is fitted to the end of the carriage arm 160 which is rotated by the actuator 170.

In this magnetic disk device 100, when information is recorded or read, the magnetic disk 5 is rotated by the spindle motor 120. At the same time, the carriage arm 160, driven by the actuator 170, rotates around the shaft 150 so that the head slider 1 which was distant from the magnetic disk 5 moves towards the innermost area of the recording surface of the rotating magnetic disk 5. Due to the actuator 170, the head slider 1 then moves from the innermost area to the outermost area of the magnetic disk 5, and recording (write) and/or a read of information from or to the magnetic disk 5 takes place. After recording or readout of information is complete, the head slider 1 withdraws from above the magnetic disk 5, and the rotation of the magnetic disk 5 stops.

Figure 2:
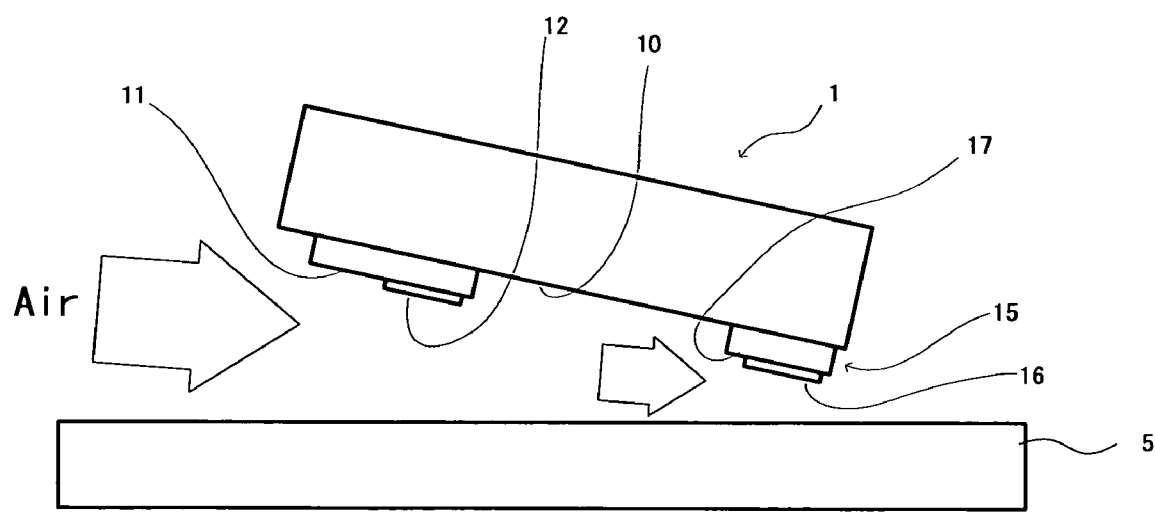
FIG. 2 is a schematic view showing one example of a state wherein the head slider is floating above the rotating magnetic disk.
Figure 3:
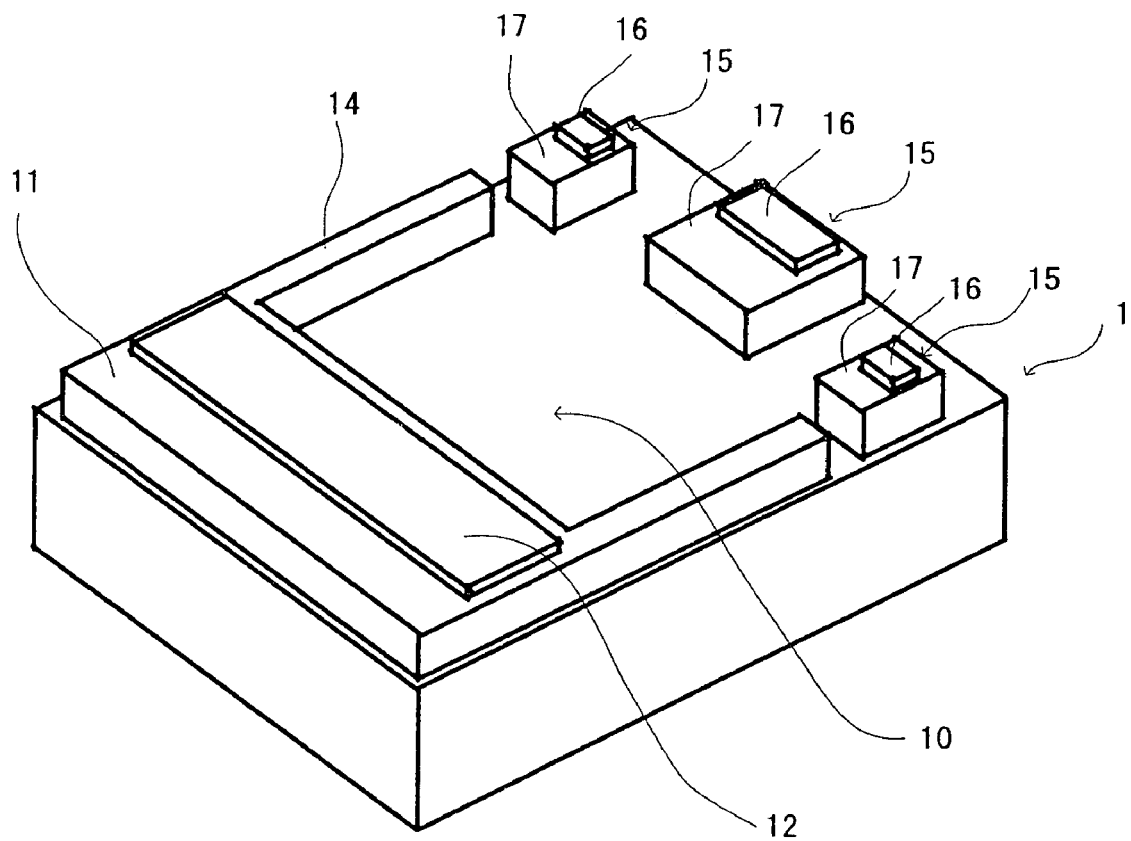
FIG. 3 is a schematic view showing a prior art example of a floating surface (air inflow surface: ABS (Air Bearing Surface)) of a head slider.

When the head slider 1 moves over the rotating magnetic disk 5, as shown in FIG. 2, the end, i.e., the inflow end of the head slider 1 receives a flotation force due to an air current produced on the surface of the magnetic disk 5 when it rotates, and then floats up higher than the rear end, i.e. the outflow end. Specifically, in the head slider 1, on the surface facing the magnetic disk 5, i.e., the air outflow/inflow (ABS (Air Bearing Surface)), due to the air flowing in from the inflow end, a positive pressure (flotation force) is imparted to the inflow-end-side-positive-pressure part 12 tending to separate it from the magnetic disk 5 so that the inflow-end-side-positive-pressure part 12 floats up, and due to the air which has passed through the inflow-end-side-positive-pressure part 12, a negative pressure aspirating towards the magnetic disk 5 is imparted to the negative pressure part 10 which is furthest from the magnetic disk 5 in the head slider 1. As a result of the air which has passed through the negative pressure part 10, a positive pressure (flotation force) tending to separate it from the magnetic disk 5 is imparted to the outflow-end-side-positive-pressure part 16 protruding furthest towards the magnetic disk 5 in the same way as the inflow-end-side-positive-pressure part 12 in the head slider 1, and the outflow-end-side-positive-pressure part 16 floats up. Moreover, in this negative pressure part 10, two or more extension rails, not shown in FIG. 2, are installed, so the negative pressure is always suitably controlled regardless of variation of atmospheric pressure (altitude).

The magnetic disk device of the present invention comprises the head slider of the present invention, so a uniform flotation amount is maintained from the inner area to the outer area of the magnetic disk during recording, etc., a constant flotation gap is maintained even during seek operations, there is no limitation of groove depth, and the flotation amount variation can be optimized relative to groove depth. Also, it does not require additional structures or manufacturing costs, is not subject to the limitations of manufacturing errors and assembly errors, can be used even when the atmospheric pressure varies (even at an altitude of 3000 m), permits high density recording and has a high performance.

The magnetic disk device of the present invention may for example be used in various recording/playback devices such as hard disk drives (HDD).

One embodiment of the present invention will now be described, but it will be understood that the invention is not to be construed as being limited to this embodiment in any way.

(Embodiment 1)

Figure 4:
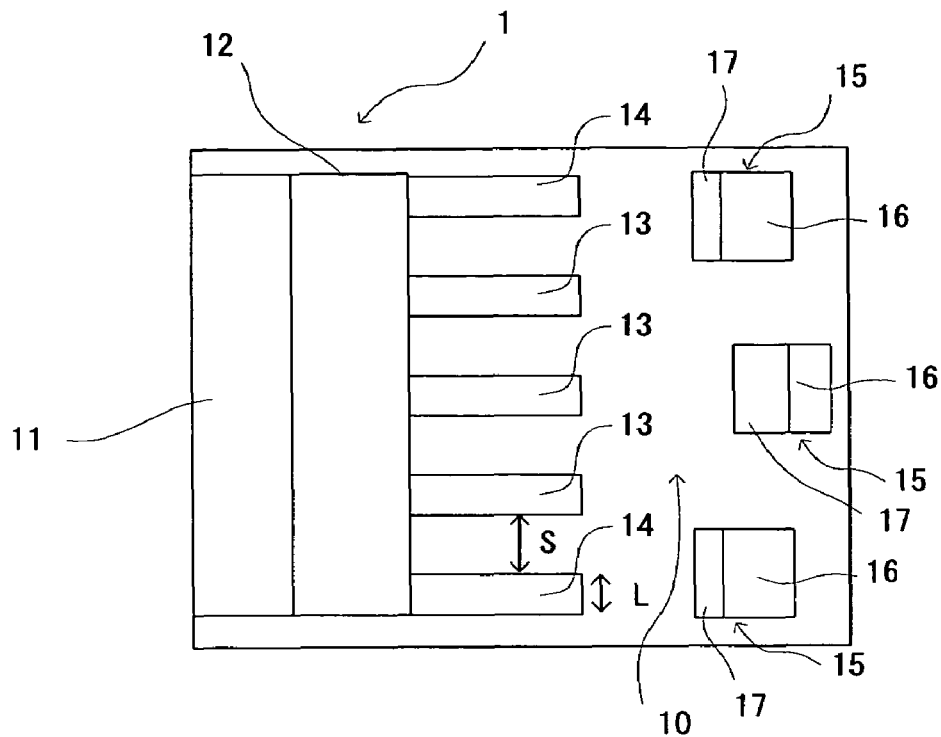
FIG. 4 is a plan view showing one example of a first aspect (Example 1: toothcomb rail) of a floating surface (surface facing a magnetic disk) in the head slider of the present invention.

The shape of the surface facing the magnetic disk, i.e., the air outflow/inflow surface (ABS (Air Bearing Surface)), in the head slider of Embodiment 1 will now be described referring to FIG. 4 (plan view). As shown in FIG. 4, the head slider 1 comprises an inflow end, outflow end, inflow-end-side rail 11, negative pressure part 10, three extension rails 13, a pair of siderails 14, an inflow-end-side-positive-pressure part 12, outflow-end-side-positive-pressure part 16 and outflow end rails 17.

The inflow-end-side rail 11 extends in the width direction of the head slider 1 in contact with the inflow end, and has a rectangular shape of fixed width. The inflow-end-side rail 11 protrudes more than the negative pressure part 10, and as a result, a vertical portion (difference in level) is formed at the boundary between the inflow-end-side rail 11 and the negative pressure part 10.

The inflow-end-side-positive-pressure part 12 extends in the width direction of the head slider 1, is in contact with the inflow-end-side rail 11, is positioned further towards the outflow end side than the inflow-end-side rail 11, and has a rectangular shape of fixed width. The inflow-end-side-positive-pressure part 12 protrudes more than the inflow-end-side rail 11, and as a result, another vertical portion (difference in level) is formed at the boundary between the inflow-end-side-positive-pressure part 12 and inflow-end-side rail 11.

Each of the pair of siderails 14 respectively extends from the inflow end to the outflow end side at both lateral sides of the head slider 1, and have a rectangular shape of fixed width. For each siderail 14, one end thereof is in contact with the inflow-end-side-positive-pressure part 12, while the other end has an end part shape with a plane parallel to the width direction of the head slider 1. The siderail 14 protrudes more than the negative pressure part 10 and is formed lower than the inflow-end-side-positive-pressure part 12, and as a result, vertical porsions (differences in level) are formed at the boundary between the inflow-end-side-positive-pressure part 12 and siderail 14, and at the boundary between the siderail 14 and negative pressure part 10.

The three extension rails 13 each extend from the inflow end to the outflow end, and have a rectanaular shaped fixed width. For each extension rail 13, one end thereof is in contact with the inflow-end-side-positive-pressure part 12, while the other end has an end part having a plane shape parallel to the width direction of the head slider 1. The extension rail 13 protrudes more than the negative pressure part 10, and is formed lower than the inflow-end-side-positive-pressure part 12. As a result, vertical portions (differences in level) are formed at the boundary between the inflow-end-side-positive-pressure part 12 and extension rail 13, and at the boundary between the extension rail 13 and negative pressure part 10. The three extension rails 13 and pair of siderails 14 all have a width (L) of 30 μm, and the interval (S) between adjacent rails is 150 μm in all cases. In the head slider 1 of Embodiment 1, the three extension rails 13 and pair of siderails 14 all protrude by the same length towards the outflow end, these rails forming five comb-like teeth (toothcomb rail).

Three outflow-end-side-positive-pressure parts 16 are disposed at approximately equal intervals on the outflow end side of the head slider 1, and have a rectangular shape. In the outflow-end-side-positive-pressure parts 16, the widths of the two parts situated at both ends in the width direction of the head slider 1 are identical. The outflow-end-side-positive-pressure parts 16 extend in the width direction of the head slider 1 and protrude more than the negative pressure part 10, and as a result, vertical portions (differences in level) are formed at the boundary between the outflow-end-side-positive-pressure parts 16 and negative pressure part 10.

Three outflow end rails 17 disposed in contact with the outflow-end-side-positive-pressure parts 16 protrude further towards the inflow end than the outflow-end-side-positive-pressure parts 16, and further towards the outflow end side than the end parts on the outflow end side of the extension rails 13 and siderails 14, and are rectangularly-shaped. In the outflow end rails 17, the widths of the two rails situated at both ends in the width direction of the head slider 1 are identical. The outflow end rails 17 extend in the width direction of the head slider 1, protrude more than the negative pressure part 10 and are formed lower than the outflow-end-side-positive-pressure parts 16. As a result, vertical portions (differences in level) are formed at the boundary between the outflow-end-side-positive-pressure part 16 and outflow end rail 17, and at the boundary between the outflow end rail 17 and the negative pressure part 10. In combination, the outflow-end-side-positive-pressure part 16 and outflow end rail 17 may be referred to as an "outflow end block 15".

In other words, in the head slider 1, in the air outflow/inflow surface (ABS (Air Bearing Surface)), the inflow-end-side rail 11, three extension rails 13, pair of siderails 14 and outflow end rails 17 protrude more than the negative pressure part 10, so a vertical portion (difference in level) is formed at each boundary between the negative pressure part 10, and the inflow-end-side rail 11, three extension rails 13, pair of siderails 14, or outflow end rails 17. Also, the inflow-end-side-positive-pressure part 12 and outflow-end-side-positive-pressure part 16 protrude more than the inflow-end-side rail 11, three extension rails 13, pair of siderails 14 and outflow end rails 17, so a vertical portion (difference in level) is formed at each boundary between the inflow-end-side rail 11, three extension rails 13, pair of siderails 14 or outflow end rail 17, and the inflow-end-side-positive-pressure part 12 or outflow-end-side-positive-pressure part 16.

Hereinabove, a description was given of how far other elements protrude compared to the negative pressure part 10 as a reference surface, but now, conversely, the question will be considered of how much deeper the grooves formed by other elements are compared to the inflow-end-side-positive-pressure part 12 and outflow-end-side-positive-pressure part 16 as reference surfaces. In this case, the inflow-end-side rail 11, three extension rails 13, pair of siderails 14 or outflow end rails 17 are formed lower (shallow grooves) than the inflow-end-side-positive-pressure part 12 and outflow-end-side-positive-pressure part 16, and the negative pressure part 10 is formed even lower (deep grooves) than the inflow-end-side rail 11, three extension rails 13, pair of sidewalls 14 or outflow end rails 17.

The head slider 1 is fitted to the end of the carriage arm 160 in the magnetic disk device 100 shown in FIG. 1, and when it moves over the rotating magnetic disk 5, as shown in FIG. 2, the head slider 1 is held floating above the magnetic disk 5. Specifically, in the air outflow/inflow surface (ABS (Air Bearing Surface)) of the head slider 1, due to air flowing in from the inflow end, a positive pressure (flotation force) is imparted to the inflow-end-side-positive-pressure part 12 tending to separate it from the magnetic disk 5, and the inflow-end-side-positive-pressure part 12 floats up. Subsequently, due to the air which has passed through the inflow-end-side-positive-pressure part 12, a negative pressure aspirating towards the magnetic disk 5 is imparted to the negative pressure part 10. The negative pressure acts to cancel the positive pressure. Hence, as shown in FIG. 2, due to the air flow produced on the surface of the magnetic disk 5 due to its rotation, the front end of the head slider 1, i.e., the inflow end, is subject to a positive pressure (flotation force) which tends to lift it up, whereas the rear end, i.e., the outflow end, is subject to a negative pressure tending to lower it towards the magnetic disk 5. As a result, the head slider 1 is held with the inflow end floating higher than the outflow end. As a result of the passage of air through the negative pressure part 10, in the head slider 1, the outflow-end-side-positive-pressure part 16 protruding furthest towards the magnetic disk 5 is subject to a positive pressure (flotation force) in the same way as the inflow-end-side-positive-pressure part 12, and floats up. The positive pressure (flotation force) resulting from the outflow-end-side-positive-pressure part 16 acts to cancel the negative pressure as a result of the negative pressure part 10. Hence, as shown in FIG. 2, the rear end of the head slider 1, i.e., outflow end side is effectively prevented from falling towards and coming into contact with the magnetic disk 5, and the head slider 1 is held floating at a fixed interval from the magnetic disk 5.

In the negative pressure part 10, three extension rails 13, not shown in FIG. 2, are installed at equal intervals inside the pair of siderails 14, so the force of the negative pressure in the negative pressure part 10 is always suitably controlled regardless of variations of atmospheric pressure (altitude). As a result, the head slider 1 of the Embodiment 1 can maintain a uniform flotation amount from the inner area to the outer area of the magnetic disk 5, can maintain a fixed flotation gap even during seek operations, is not subject to limitations of the groove depth of "shallow grooves" or "deep grooves", permits optimization of flotation amount variation relative to groove depth, does not require additional structures or manufacturing costs, is not subject to restrictions due to manufacturing errors or assembly errors, and in particular, can be used even when the atmospheric pressure varies (can be used even at an altitude of 3000 m).

Figure 10:
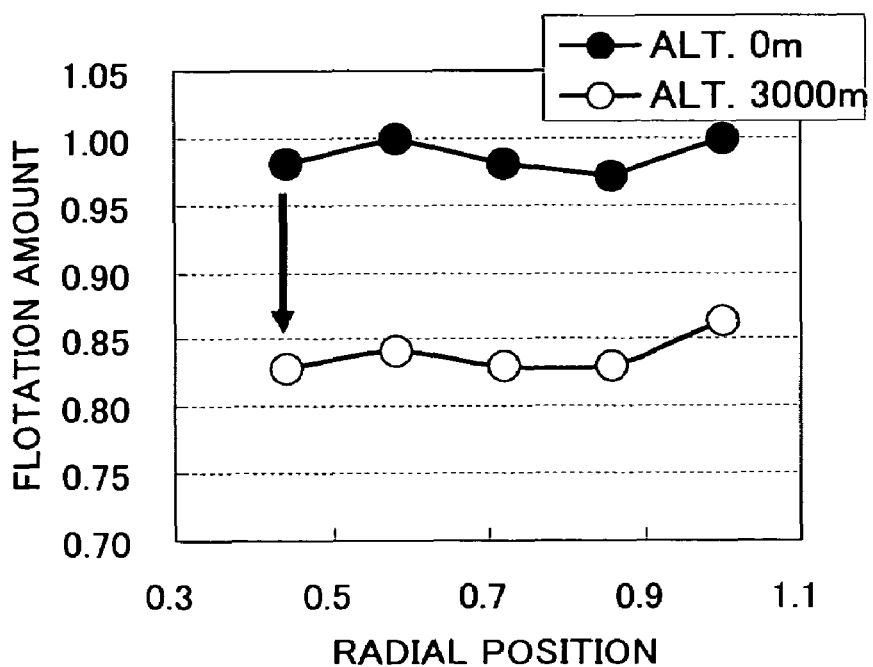
FIG. 10 is graph data showing one example of the relation between radial position of the head slider (comprising a toothcomb rail) of the present invention over a magnetic disk and flotation amount of the head slider at altitudes of 0 m and 3000 m.

The relation between the radial position of the head slider of Embodiment 1 over the magnetic disk and the flotation amount was simulated for altitudes of 0 m and 3000 m, as shown in FIG. 10 (vertical axis and horizontal axis are both shown in dimensionless units), the flotation amount at an altitude of 3000 m was slightly less than that at 0 m, but under each altitude (atmospheric pressure) condition, it was found that a constant flotation amount could be maintained at any radial position of the magnetic disk, whether the altitude was 0 m or 3000 m.

Figure 9:
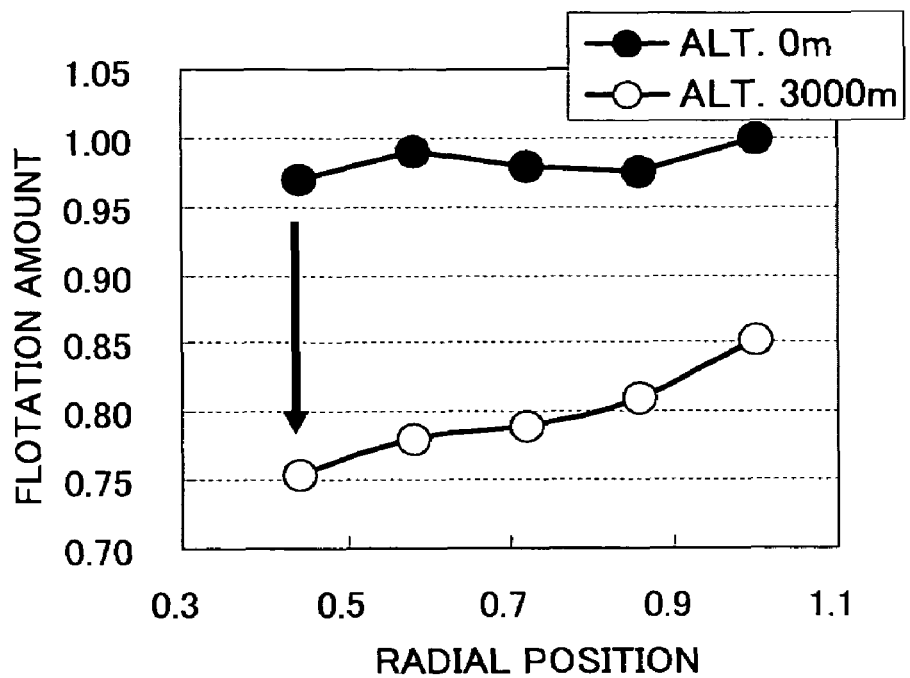
FIG. 9 is graph data showing one example of the relation between radial position of a prior art head slider over a magnetic disk and flotation amount of the head slider at altitudes of 0 m and 3000 m.

On the other hand, in the case of the prior art head slider not provided with the extension rails of the head slider of Embodiment 1, as described above, when the relation between the radial position of the head slider over the magnetic disk and the flotation amount was simulated for altitudes of 0 m and 3000 m, as shown in FIG. 9 (vertical axis and horizontal axis are both shown in dimensionless units), the flotation amount was much smaller at an altitude of 3000 m than at 0 m, and it was found that if it was used at an altitude of 3000 m, the flotation amount varied according to the radial position of the magnetic disk, and a constant flotation amount could not be maintained.

Figure 11:
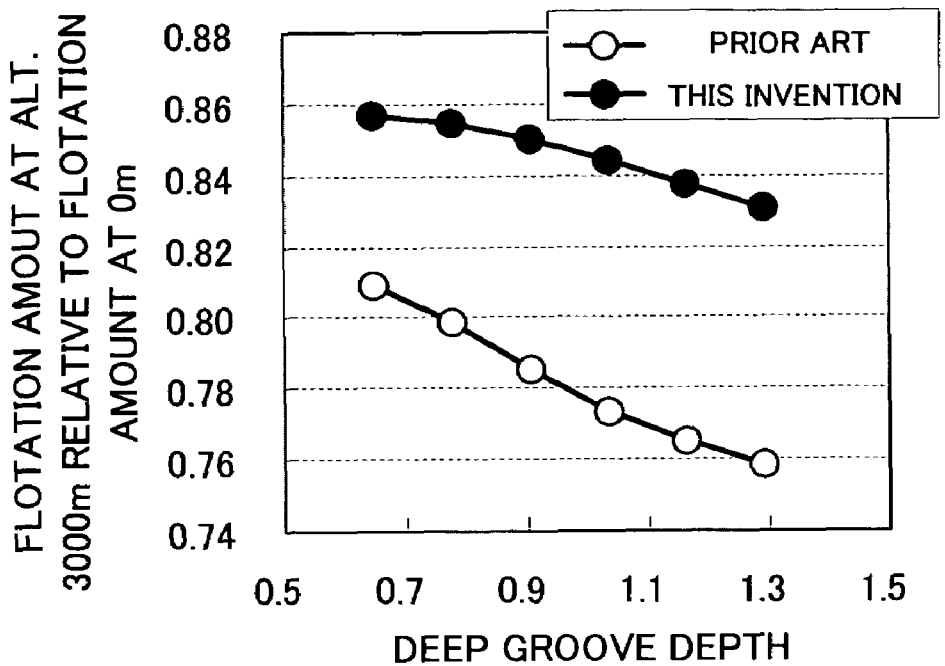
FIG. 11 is graph data showing the relation between groove depth and flotation amount variation for the head slider of the present invention and the head slider of the prior art.

Further, when the relation between the deep groove depth (groove depth of the negative pressure part compared to the inflow-end-side-positive-pressure part or outflow-end-side-positive-pressure part as a reference surface) and the flotation amount ratio (altitude 0 m/altitude 3000 m) of the head slider of Embodiment 1 was simulated, as shown in FIG. 11 (vertical axis and horizontal axis are dimensionless), it was found that the flotation amount ratio was substantially constant even if the deep groove depth was varied, and in the head slider of Embodiment 1, the groove depth dependency on atmospheric pressure was small and the effect of atmospheric pressure (altitude) was small.

On the other hand, in the case of the head slider of the prior art wherein the extension rails of the head slider of Embodiment 1 were not provided, as described above, when the relation between the deep groove depth (groove depth of the negative pressure part compared to the inflow-end-side-positive-pressure part or outflow-end-side-positive-pressure part as a reference surface) and the flotation amount ratio (altitude 0 m/altitude 3000 m) was simulated, as shown in FIG. 11, it was found that the flotation amount ratio largely varied when the deep groove depth was varied, and in the head slider of the prior art, the groove depth dependency on atmospheric pressure was large and the effect of atmospheric pressure (altitude) was large.

(Embodiment 2)

Figure 5:
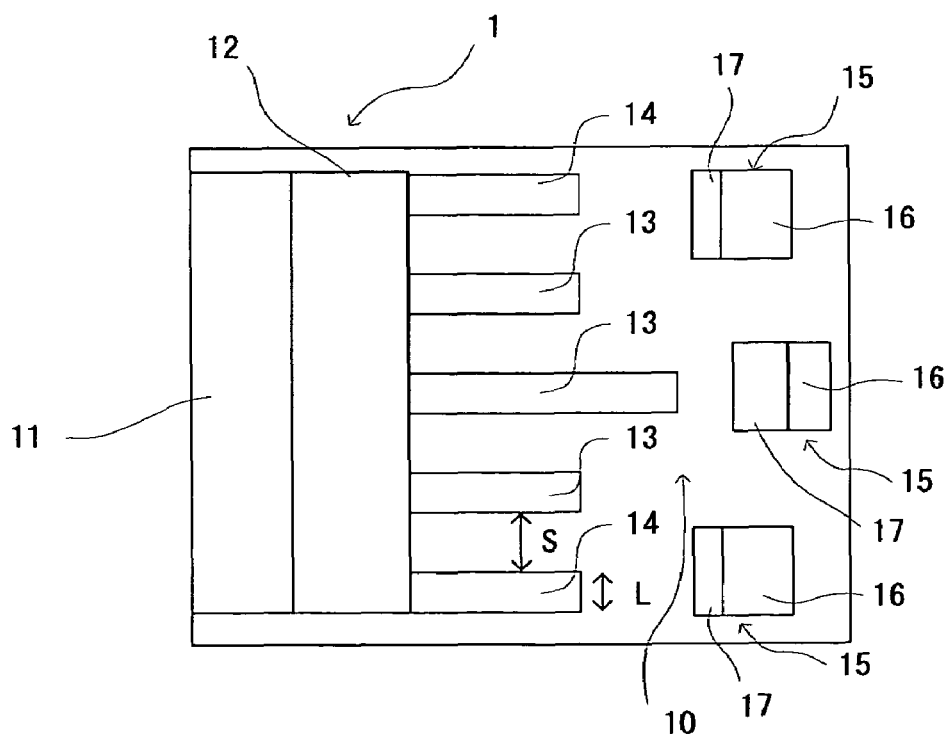
FIG. 5 is a plan view showing one example of a second aspect (Example 2: toothcomb rail) of a floating surface (surface facing a magnetic disk) in the head slider of the present invention.

The head slider of Embodiment 2, as shown in FIG. 5 (plan view), is identical to the head slider 1 of Embodiment 1, except that in the head slider 1 of Embodiment 2, the end part on the outflow end side of the central extension rail 13 protrudes further towards the outflow end than the end parts on the outflow end side of the extension rails 13 situated adjacently, and the end parts on the outflow end side of the siderails 14 situated outside of the extension rails 13. The head slider has an identical effect to that of the head slider of Embodiment 1.

(Embodiment 3)

Figure 6:
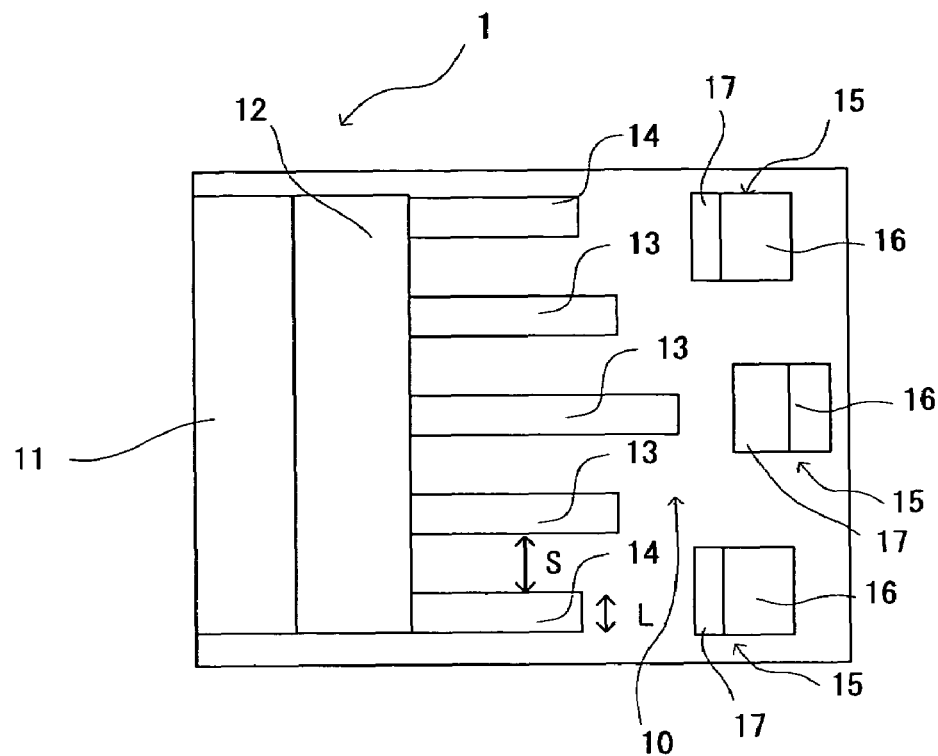
FIG. 6 is a plan view showing one example of a third aspect (Example 3: toothcomb rail) of a floating surface (surface facing a magnetic disk) in the head slider of the present invention.

The head slider of Embodiment 3, as shown in FIG. 6 (plan view), is identical to the head slider 1 of Embodiment 1, except that in the head slider 1 of Embodiment 3, the end part on the outflow end side of the central extension rail 13 protrudes further towards the outflow end than the end parts on the outflow end side of the extension rails 13 situated adjacently, and the end parts on the outflow end side of the these adjacent extension rails 13 protrude further towards the outflow end side than the end parts on the outflow end side of the siderails 14 situated outside these adjacent extension rails 13. The head slider has an identical effect to that of the head slider of Embodiment 1.

In the head slider of Embodiment 3, the end part center points on the outflow end side of the siderails 14, the end part center points on the outflow end side of the extension rails 13 disposed adjacent to these siderails 14 and the end part center point on the outflow end side of the central extension rail 13 adjacent to these extension rails 13, can be joined by two straight lines (end part center point connecting lines).

(Embodiment 4)

Figure 7:
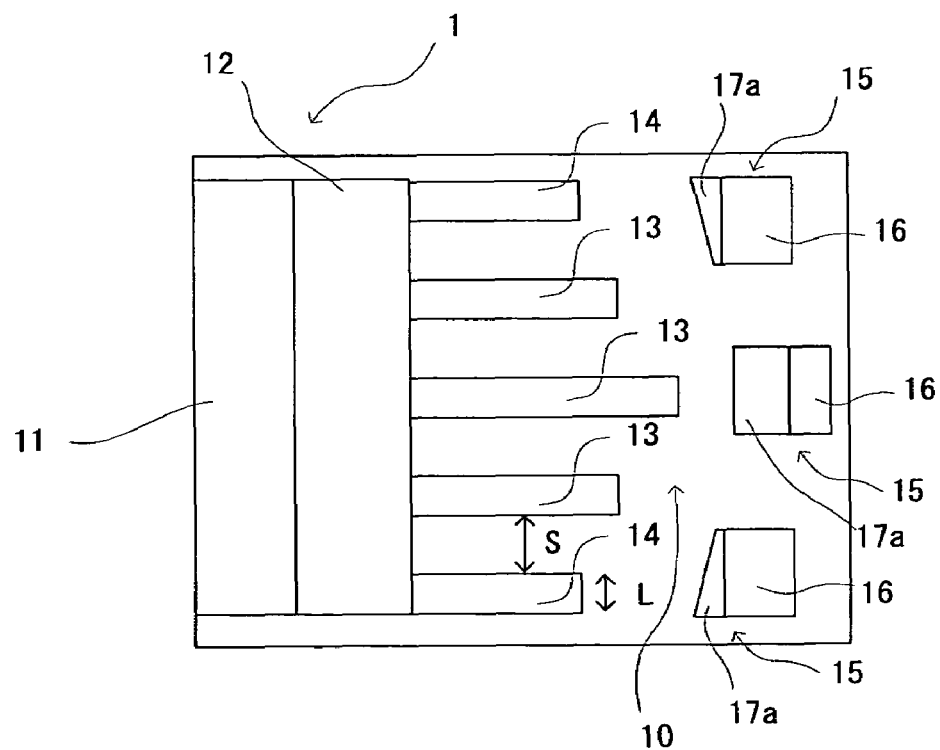
FIG. 7 is a plan view showing one example of a fourth aspect (Example 4: toothcomb rail) of a floating surface (surface facing a magnetic disk) in the head slider of the present invention.

The head slider of Embodiment 4, as shown in FIG. 7 (plan view), is identical to the head slider 1 of Embodiment 3, except that in the head slider 1 of Embodiment 4, the boundary line of outflow end rails 17a situated at both ends facing the negative pressure part 10 is parallel to the aforesaid end part centerpoint connecting line. The head slider has an identical effect to that of the head slider of Embodiment 3.

(Embodiment 5)

Figure 8:
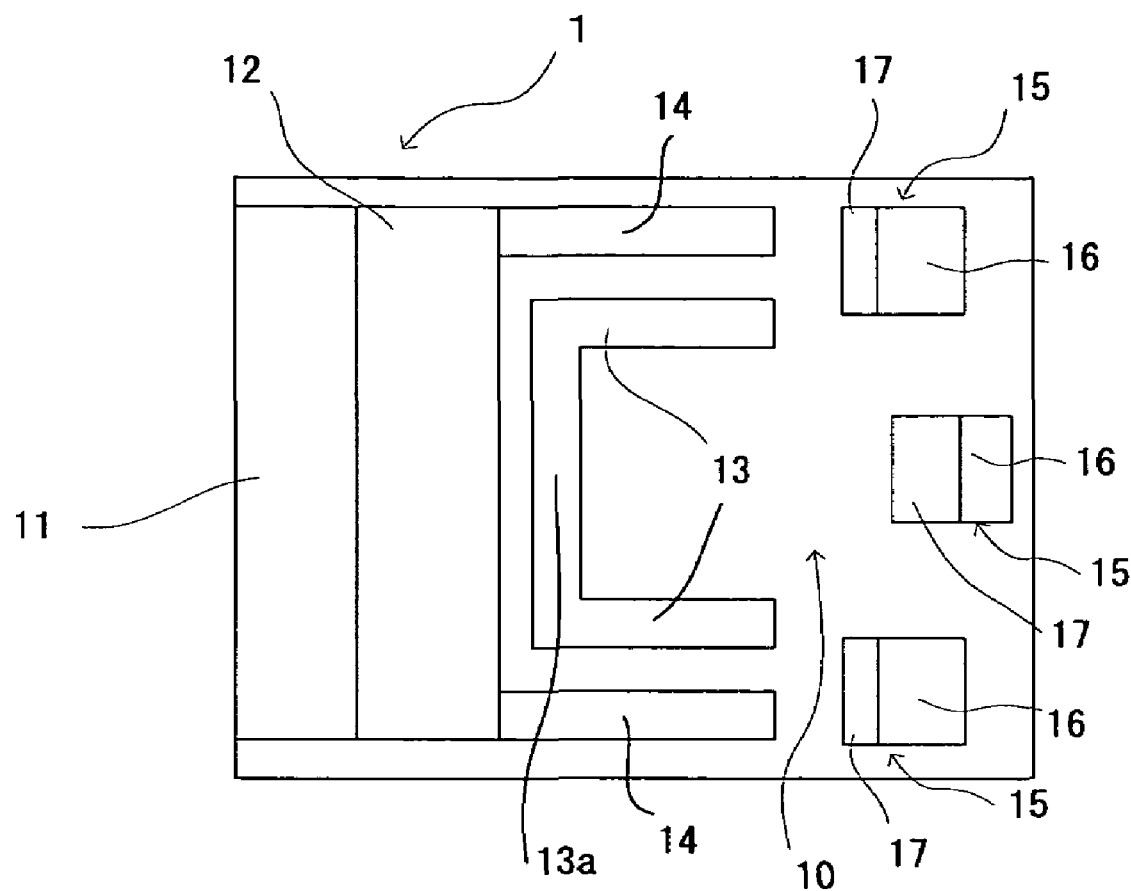
FIG. 8 is a plan view showing one example of a fifth aspect (Example 5: U-shaped rail) of a floating surface (surface facing a magnetic disk) in the head slider of the present invention.

The head slider of Embodiment 5, as shown in FIG. 8 (plan view), is identical to the head slider 1 of Embodiment 1, except that in the head slider 1 of Embodiment 5, the three extension rails 13 (toothcomb rails) are replaced by an U-shaped rail (formed by joining the end parts of two extension rails on the inflow end side by a connecting rail 13a).

Figure 13:
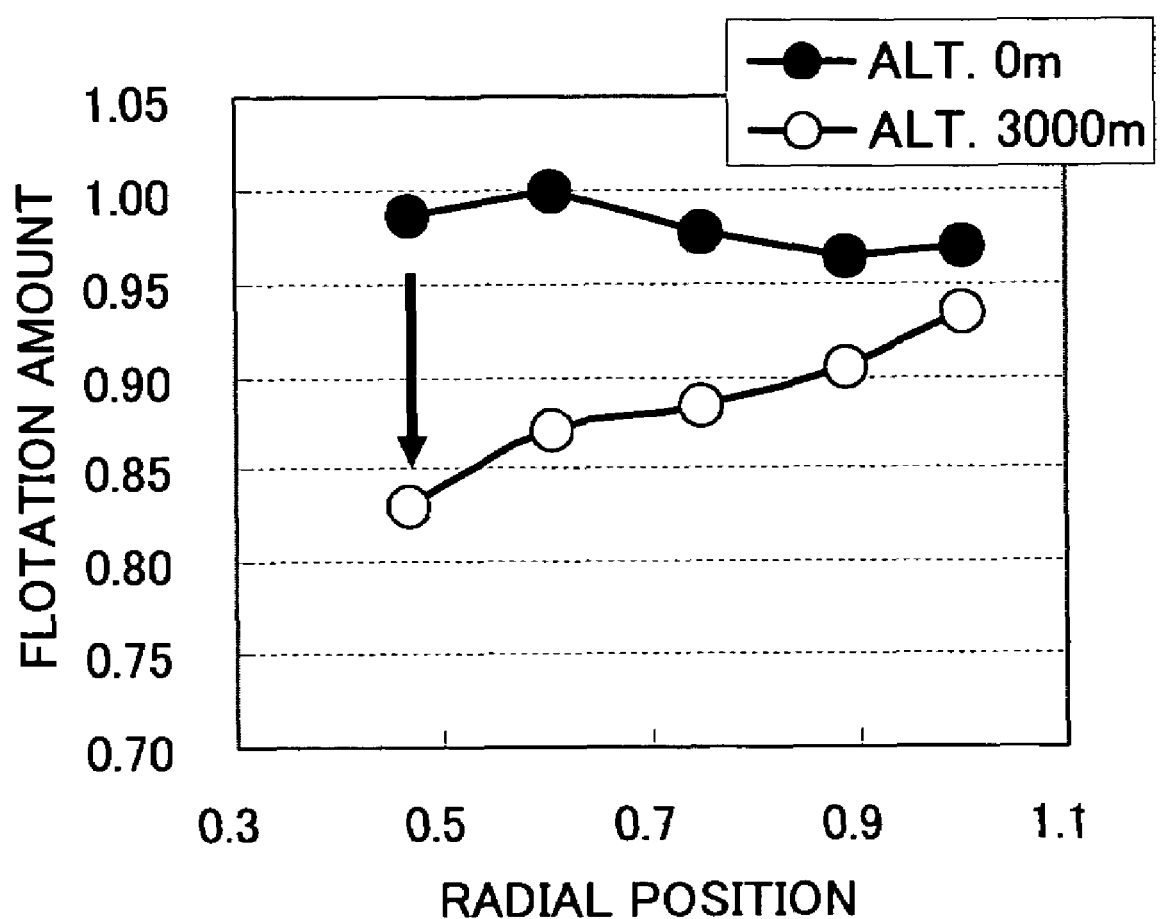
FIG. 13 is graph data showing one example of the relation between the radial position of the head slider (comprising an U-shaped rail) of the present invention over a magnetic disk and flotation amount of the head slider at altitudes of 0 m and 3000 m.

When the relation between the radial position of the head slider over the magnetic disk and the flotation amount was simulated for altitudes of 0 m and 3000 m with the head slider of Embodiment 5, as shown in FIG. 13 (vertical axis and horizontal axis are dimensionless), the flotation amount at an altitude of 3000 m was slightly less than that at 0 m, but under each altitude (atmospheric pressure) condition, it was found that a constant flotation amount could be maintained at any radial position of the magnetic disk, whether the altitude was 0 m or 3000 m.

Figure 12:
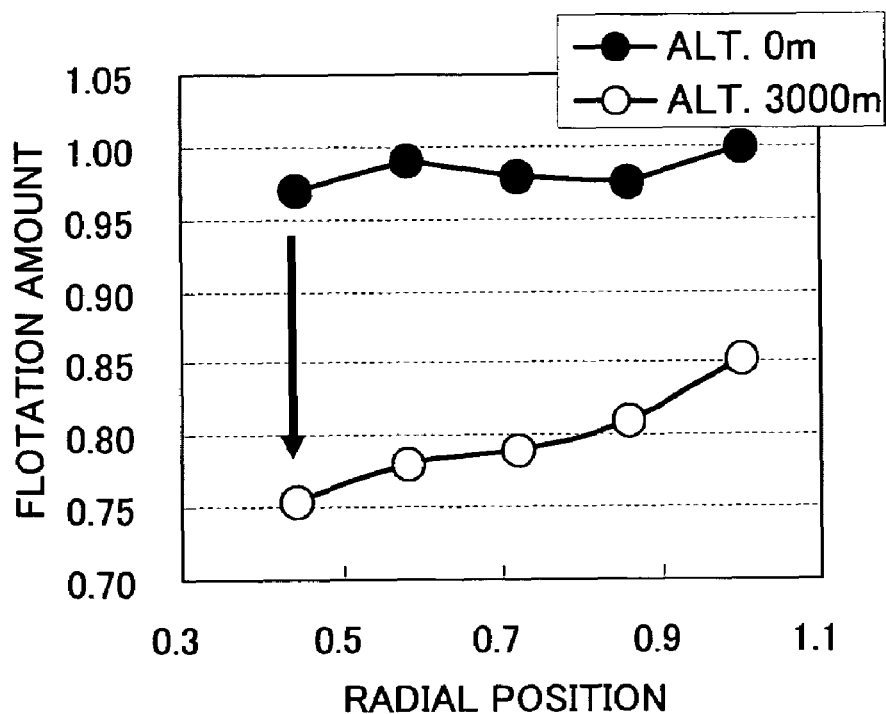
FIG. 12 is graph data showing one example of the relation between the radial position of a prior art head slider over a magnetic disk and flotation amount of the head slider at altitudes of 0 m and 3000 m.

On the other hand, in the case of the prior art head slider not provided with the extension rails of the head slider of Embodiment 1, as described above, when the relation between the radial position of head slider over the magnetic disk and the flotation amount was simulated for altitudes of 0 m and 3000 m, as shown in FIG. 12 (vertical axis and horizontal axis are both shown in dimensionless units), the flotation amount was much smaller at an altitude of 3000 m than at 0 m, and it was found that if it was used at an altitude of 3000 m, the flotation amount varied according to the radial position of the magnetic disk, and a constant flotation amount could not be maintained.

The head slider of the present invention maintains a uniform flotation amount from the inner area to the outer area of the magnetic disk, maintains a constant flotation gap even during seek operations, has no limitation of groove depth, and the flotation amount variation can be optimized relative to groove depth. Also, it does not require additional structures or manufacturing costs, is not subject to the limitations of manufacturing errors and assembly errors, and can be used even when the atmospheric pressure varies (even at an altitude of 3000 m). The head slider may conveniently be used in magnetic disk devices such as hard disk drives (HDD), and other recording devices.

The magnetic disk device of the present invention may conveniently be used in magnetic disk devices such as hard disk drives (HDD), and other recording devices. As it comprises the head slider of the present invention, a uniform flotation amount is maintained from the inner area to the outer area of the magnetic disk, a constant flotation gap is maintained even during seek operations, there is no limitation of groove depth, and the flotation amount variation can be optimized relative to groove depth. Also, it does not require additional structures or manufacturing costs, is not subject to the limitations of manufacturing errors and assembly errors, and can be used even when the atmospheric pressure varies (even at an altitude of 3000 m), so it can be used even on high ground having an altitude of about 3000 m without any appreciable loss of performance.

What is claimed is:

1. A head slider, comprising:
    a disk-facing surface having an inflow end to which air flows in and an outflow end from which air flows out;
    an inflow-end-side rail situated on the disk-facing surface and extending along the inflow end;
    a negative pressure part situated on the disk-facing surface closer to the outflow end than the inflow-end-side rail, the negative pressure part developing a negative pressure while in use; and
    two or more extension rails of constant width situated on the disk-facing surface and extending in the negative pressure part from the inflow end to the outflow end; and
    an inflow-end-side-positive-pressure part situated further towards the outflow end than the inflow-end-side rail and further towards the inflow end than the extension rails, the inflow-end-side-positive-pressure part developing a positive pressure while in use,
    wherein said two or more extension rails are arranged along parallel straight lines and extend in a direction perpendicular to a width direction, and
    wherein the inflow-end-side-positive-pressure part extends in the width direction along the inflow-end-side rail and in contact with the inflow-end side rail, and at least one of the end parts on the inflow end side of the extension rails is in contact with the inflow-end-side-positive-pressure part.

2. A head slider according to claim 1, wherein the number of the extension rails is three or more.

3. A head slider according to claim 1, wherein the inflow-end-side rail extends continuously along the inflow end.

4. A head slider according to claim 1, further comprising two or more siderails situated on the disk-facing surface and extending at least partially from the inflow end to the outflow end of the head slider,
    wherein the negative pressure part is situated further towards the outflow end than the inflow-end-side rail, and is bordered by the siderails.

5. A head slider according to claim 4, wherein at least one of the end parts on the outflow end side of the extension rails protrudes further towards the outflow end side than the end part on the outflow end side of the siderails.

6. A head slider according to claim 4, wherein the end parts on the outflow end side of the extension rails protrude further towards the outflow end side than the end parts on the outflow end side of the siderails.

7. A head slider according to claim 4, wherein among the extension rails, at least one of the end parts on the outflow end side of the extension rails situated an equal number of rails away starting from the siderails at both ends in the width direction and close to the center in the width direction protrudes further towards the outflow end than the end parts on the outflow end side of the other extension rails.

8. A head slider according to claim 4, wherein the end parts on the outflow end side of the extension rails protrude further towards the outflow end side in succession from those situated adjacent to the siderails to those situated in the vicinity of the center.

9. A head slider according to claim 4, wherein end parts of the outflow end sides of the siderails and extension rails are arranged in a straight line from the siderails to a center of the disk-facing surface.

10. A head slider according to claim 4, further comprising an inflow-end-side-positive-pressure part situated further towards the outflow end than the inflow-end-side rail and further towards the inflow end than the siderails, the inflow-end-side-positive-pressure part developing a positive pressure while in use.

11. A head slider according to claim 10, wherein, when the disk-facing surface is positioned facing downwards, the inflow-end-side rail, siderails and extension rails protrude further downwards than the negative pressure part, and the inflow-end-side-positive-pressure part protrudes further downwards than the inflow-end-side rail, siderails and extension rails.

12. A head slider according to claim 10, wherein the inflow-end-side-positive-pressure part extends in a width direction along the inflow-end-side rail and in contact with the inflow-end-side rail, and at least one of the end parts on an inflow end side of the siderails is in contact with the inflow-end-side-positive-pressure part.

13. A head slider according to claim 4, further comprising a connecting rail situated on the disk-facing surface,
    wherein at least two of the end parts on the inflow end side of the extension rails and siderails are joined by the connecting rail extending in the width direction.

14. A head slider according to claim 13, wherein the number of the connecting rails is two or more.

15. A head slider according to claim 4, wherein the extension rails and siderails are substantially rectangularly-shaped and have a fixed width.

16. A head slider according to claim 4, comprising an outflow-end-side-positive-pressure part situated on the disk-facing surface and further towards the outflow end than the extension rails and siderails, which develops a positive pressure while in use.

17. A head slider according to claim 16, wherein the inflow-end-side rail, siderails and extension rails protrude further from the disk-facing surface than the negative pressure part, and the inflow-end-side-positive-pressure part and outflow-end-side-positive-pressure part protrude further from the disk-facing surface than the inflow-end-side rail, siderails and extension rails.

18. A head slider according to claim 17, further comprising an outflow end rail adjacent to the inflow end side of the outflow-end-side-positive-pressure part, the outflow end rail protruding from the disk-facing surface less than the outflow-end-side-positive-pressure part and more than the negative pressure part.

19. A head slider according to claim 18, wherein the edge of the outflow end rail in contact with the negative pressure part and a line interconnecting adjacent center points in the width direction of the end parts of the siderails and extension rails on the outflow end side, are substantially parallel.

20. A head slider according to claim 16, wherein the outflow-end-side-positive-pressure parts are substantially rectangularly-shaped, and at least one of the end parts on the outflow end side of the outflow-end-side-positive-pressure parts situated in the vicinity of the center in the width direction, is situated further towards the outflow end than the end parts on the outflow end side of the other outflow-end-side-positive-pressure parts.

21. A head slider according to claim 16, wherein the number of the outflow-end-side-positive-pressure parts is from 2 to 4.

22. A head slider according to claim 1, wherein the end parts on the outflow end side of the extension rails have a flat plane shape parallel to the width direction.

23. A head slider according to claim 1, wherein a distance between adjacent extension rails is 10 μm to 120 μm.

24. A head slider according to claim 1, wherein a width of the extension rails is 5 μm to 100 μm.

25. A head slider according to claim 1, having a symmetrical shape having a plane of symmetry arranged on a center axis extending from the inflow end to the outflow end.

26. A magnetic disk device comprising at least one head slider, the head slider comprising:

a disk-facing surface having an inflow end to which air flows in and an outflow end from which air flows out;

an inflow-end-side rail situated on the disk-facing surface and extending along the inflow end;

a negative pressure part situated on the disk-facing surface closer to the outflow end than the inflow-end-side rail, the negative pressure part developing a negative pressure while in use;

two or more extension rails of constant width situated on the disk-facing surface and extending in the negative pressure part from the inflow end to the outflow end; and an inflow-end -side-positive-pressure part situated further towards the outflow end than the inflow-end-side rail and further towards the inflow end than the extension rails, the inflow-end-side-positive-pressure part developing a positive pressure while in use, wherein said two or more extension rails are arranged along parallel straight lines and extend in a direction perpendicular to a width direction, and wherein the inflow-end-side-positive-pressure part extends in the width direction along the inflow-end-side rail and in contact with the inflow-end-side rail, and at least one of the end parts on the inflow end side of the extension rails is in contact with the inflow-end-side-positive-pressure part.

* * * * *